May 16, 1961  F. KOPIETZ  2,984,208
FISH FEEDING DEVICE
Filed March 2, 1959
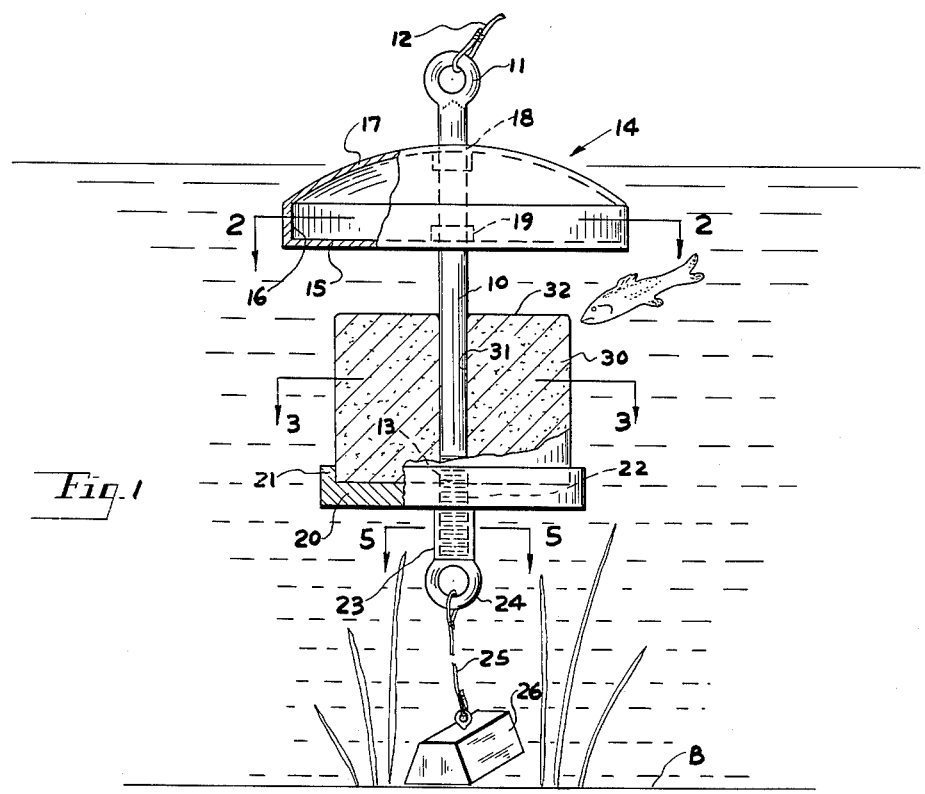
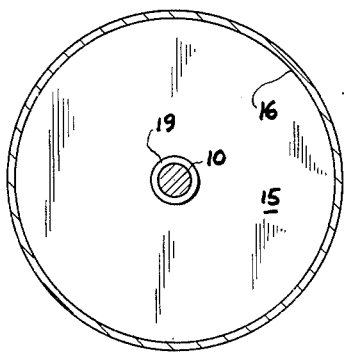
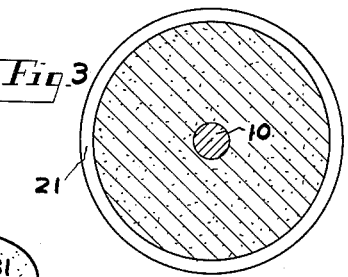
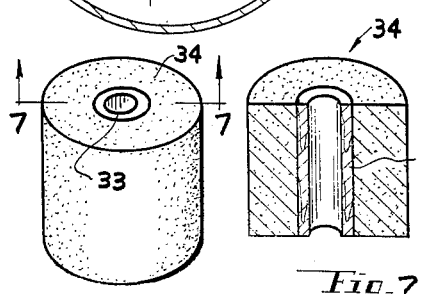
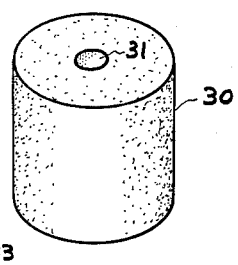
INVENTOR.
Frank Kopietz
BY
Louis Chayfka
ATTORNEY

United States Patent Office

2,984,208
Patented May 16, 1961

2,984,208

FISH FEEDING DEVICE

Frank Kopietz, 22429 Colony Ave., St. Clair Shores, Mich.

Filed Mar. 2, 1959, Ser. No. 796,576

1 Claim. (Cl. 119—51)

The invention pertains to an improved manner of preparing and shaping food to be supplied to fish, and to a device for support of said food when immersed in water. Specifically, the device and the food in the form carried thereby have been developed for use in landlocked bodies of water, such as smaller lakes in which the fish are likely to multiply to such extent that there is not enough food for all of them. Where such a situation exists, the result is that the growth of the individual specimens of fish is retarded.

To remedy this situation it is customary to supply the fish with suitable food, such as ground meat or fish, which food is thrown in the water. As a result, particles of food of higher specific gravity than water will sink to the bottom where they may be wasted.

It is in order to remedy such a situation that I have devised my invention which includes a compacted food element and a carrier for its support, the whole to be immersed in water at a desired level beneath its surface.

I shall now describe my invention with reference to the accompanying drawings in which:

Fig. 1 is a side elevational view, partly in section, of a food carrier and a quantity of food supported thereby;

Fig. 2 is a sectional view on line 2—2 of Fig. 1;

Fig. 3 is a sectional view on line 3—3 of Fig. 1;

Fig. 4 is a perspective view of a quantity of food compacted into the form of a cylinder or roll;

Fig. 5 is a sectional view on line 5—5 of Fig. 1;

Fig. 6 is a perspective view of a modified food roll;

Fig. 7 is a vertical sectional view on line 7—7 of Fig. 6.

Similar numerals refer to similar parts throughout the several views.

The carrier shown in Fig. 1 includes a vertical shaft 10 which may be made of any suitable material, such as metal or plastic, and which at its upper end terminates with an eyelet 11 for connection to a cord 12. The opposite or lower end of the shaft is threaded, as shown at 13. Mounted upon the shaft, close to the eyelet 11, is an air-filled float, generally identified by numeral 14. The float has the form of a circular chamber defined by a flat bottom 15, a vertical wall 16 rising from the peripheral portion of the bottom, and a dome-shaped top 17.

For the purpose of being axially mounted upon the shaft 10, the top is provided within its central portion with an integrally-formed bushing 18. Similarly, the central portion of the bottom 15 includes a cylindrical bushing 19 in a vertical alinement with the bushing 18, the diameters of both bushings being such that the shaft 10 fits tightly into both and is secured within said bushings in a manner to prevent any leakage of water into the interior of said float.

Axially mounted upon the lower portion of the shaft, but in a spaced relation to its lower end, is a circular tray 20 which includes, along its rim, an annular, upwardly-rising flange 21. For the purpose of being mounted upon the shaft 10, the tray has a centrally-located circular aperture 22 which is of a diameter slightly in excess of the diameter of the shaft 10 to permit a sliding vertical movement of the tray upon said shaft.

Threaded upon the lower end of the shaft is a nut 23 which bears against the underside of the tray and keeps it against disengagement from said shaft. The nut includes an eyelet 24 for connection to a cord, such as is marked 25, which may be attached at the other end to a sinker or block, such as block 26.

The food which is to be supported by the tray is shown in Fig. 4. It may consist of particles of any suitable substance, or a number of substances, such as particles of meat, fish, and cereals, which particles are compressed together. If needed, a bonding medium, slowly soluble in water, may be used to hold the particles together to prevent rapid disintegration of the form into which the food is shaped. The preferred shape of the compacted food is that of a roll or cylinder 30, shown in Fig. 4, the cylinder being provided with a circular axial aperture 31 for engagement with said shaft 10. As the specific ingredients of the food roll are of no inventive character, no detailed description thereof appears to be necessary.

The roll is to be placed on the tray in the manner shown in Fig. 1. For this purpose the shaft 10, with the float, has to disengaged from the tray, which may be done by removing the nut 23 from the lower end 13 of said shaft 10. Next, the roll is placed on the tray endwise so that the aperture 31 in the roll is in register with the aperture 22 in the tray, whereupon the lower end of the shaft is thrust through the aperture 31 in the roll 30 and through the aperture 22 in the tray. This done, the nut 23 is again replaced upon the lower end of the shaft.

It will be noted that the upper surface 32 of the roll 30 which rests on the tray is spaced from the bottom of the float 14. The spacing is desirable to leave room for fish which may approach the roll from above.

The carrier as a whole may be held close to the surface of the body of water in which it is immersed, or at some desirable level beneath the surface. The buoyancy of the float is such that normally a part of the float may slightly project above the surface of the water. Should it be desired to hold the carrier at a lower level against the tendency of the float to rise upwardly, this may be effected by means of a sinker 26 resting on the bottom of the said body of water and attached to the shaft by a cord 25. Obviously, the length of said cord 25 will determine the depth at which the carrier may be held. The eyelet 12 at the top of the shaft may be connected to a cord serving as a means of raising the carrier out of water or for the purpose of ataching to it a floating marker to indicate the location of said carrier.

Figs. 6 and 7 show a modified food roll 34 which is provided with a solid cylindrical core 33. This may be made of a plastic or wood or some other suitable material, the core serving to impart rigidity to the roll, also to protect its inner portion adjoining the core against contact with water to prevent the roll from a premature disintegration.

It will be understood that some changes may be made in the structure of the food carrier, but that such changes would still be within the general concept disclosed herein. Thus, for instance, it does not have to be the tray which is to be removable, but, instead, the float could be removable while the tray could be permanently connected to the shaft of the carrier.

After having described my invention, what I wish to claim is as follows:

A fish food carrier comprising a float including a flat bottom wall and a dome-shaped top wall, both centrally apertured, centrally disposed aligned bushings in said float secured to and respectively extending inward of the interior surfaces of said top and bottom walls, an upright shaft extending through said float and fixedly through said bushings, an eye on the upper end of said shaft, the lower end of the shaft being threaded, a horizontal centrally apertured tray of circular form, and of less diameter than said float, loosely mounted over the lower end of the said shaft, an annular flange on said tray projecting upwardly thereof, a nut threaded over the lower end of said shaft supportably engaging the tray, an eye depending from the nut, a compacted dissolvable food element of cylindrical form and having an axial aperture therethrough loosely mounted on said shaft supported on said tray within and engaged by said flange, and a cylindrical non-dissolvable core secured within said food roll and interposed around said shaft, said food roll when immersed adapted to slowly release particles of food, the upper surface of said food roll being flat and spaced below the bottom wall of said float.

References Cited in the file of this patent

UNITED STATES PATENTS

| | | |
|---|---|---|
| 2,139,910 | Patten | Dec. 13, 1938 |
| 2,283,472 | Luxhorn | May 19, 1942 |
| 2,612,718 | Steinberg | Oct. 7, 1952 |
| 2,761,422 | Martin | Sept. 4, 1956 |
| 2,908,250 | Aniser | Oct. 13, 1959 |

FOREIGN PATENTS

| | | |
|---|---|---|
| 1,054,574 | France | Oct. 7, 1953 |